United States Patent [19]
Klambauer

[11] Patent Number: 4,687,408
[45] Date of Patent: Aug. 18, 1987

[54] LOCK FOR THE TRANSPORT OF BULK MATERIAL

[75] Inventor: Manfred Klambauer, Neumarkt, Austria

[73] Assignee: Voest-Alpine Aktiengesellschaft, Linz, Austria

[21] Appl. No.: 872,876

[22] Filed: Jun. 11, 1986

[30] Foreign Application Priority Data

Jun. 14, 1985 [AT] Austria ................................ 1781/85

[51] Int. Cl.⁴ ...................... F26B 25/00; B65G 65/00; B65G 69/00
[52] U.S. Cl. ....................................... 414/217; 34/242; 222/361; 222/636; 406/74; 417/466; 417/469
[58] Field of Search .................... 406/50, 74; 414/217; 34/242; 417/466, 467, 469; 222/636, 361

[56] References Cited

U.S. PATENT DOCUMENTS

| | | | |
|---|---|---|---|
| 1,396,859 | 11/1921 | Long | 414/217 |
| 3,633,770 | 1/1972 | Howard | 414/217 X |
| 3,994,418 | 11/1976 | Andersson | 222/361 X |
| 4,127,151 | 11/1978 | Ueda et al. | 222/361 X |

OTHER PUBLICATIONS

Japanese Abstract of JP-58-109330; Jun. 1983.

Primary Examiner—Jeffrey V. Nase
Attorney, Agent, or Firm—Cushman, Darby & Cushman

[57] ABSTRACT

In a lock for the transport of bulk material between chambers being under different pressure a lock chamber (4) is guided tightly and driven by a reciprocal movement in a preferably horizontal guide tube (2), which comprises on different sides of its wall a first opening (12) leading to the chamber with lower pressure and in an axial distance therefrom a second opening (15) leading to the chamber with higher pressure, wherein the chamber comprises openings (13, 14), which can be brought in coincidence with the first (12) and second (15) opening at the points or reversal of the reciprocal movement. Adjacent to the lock chamber (4) in axial direction is arranged a slide (3a) being tightly guided in the guide tube (2), which slide slides over the second opening (15). At the end (18) of the guide tube (2) being opposite of the first opening (12) a piston (20) is guided tightly in the guide tube (2) and is driven to moving in opposite direction to the lock chamber (4) and the transverse wall (6) delimiting the lock chamber (4) at the side adjacent to the piston (20) seals the lock chamber tube (3) in a leaky manner. Because of the displacement effect of the piston (20) the lock chamber (4) is brought to higher pressure for discharging a bulk material out of the lock and to atmospheric pressure for charging of bulk material into it.

11 Claims, 6 Drawing Figures

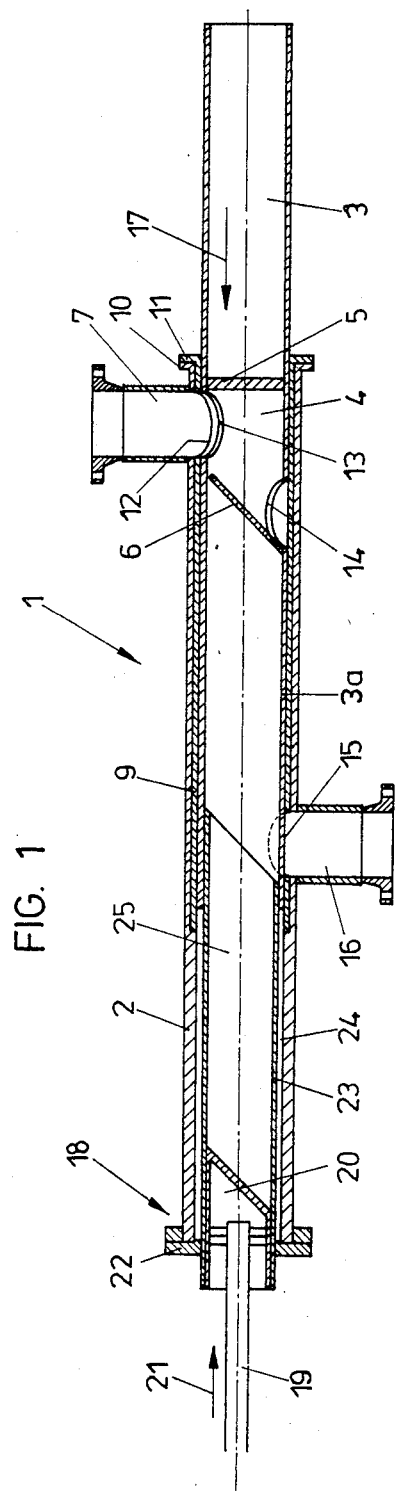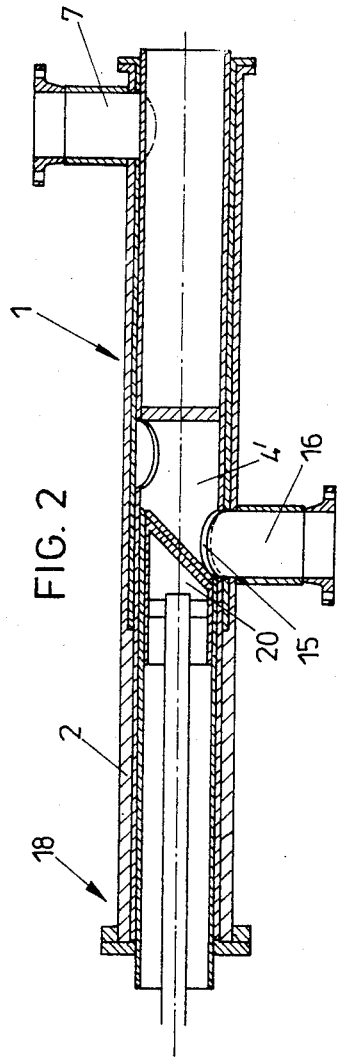

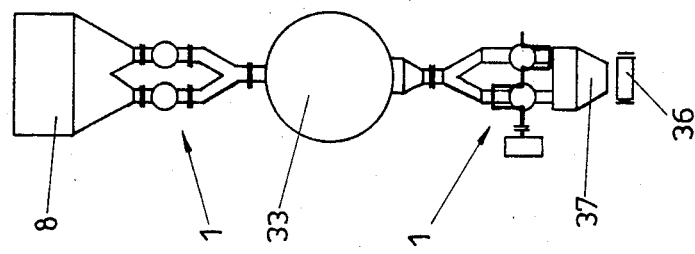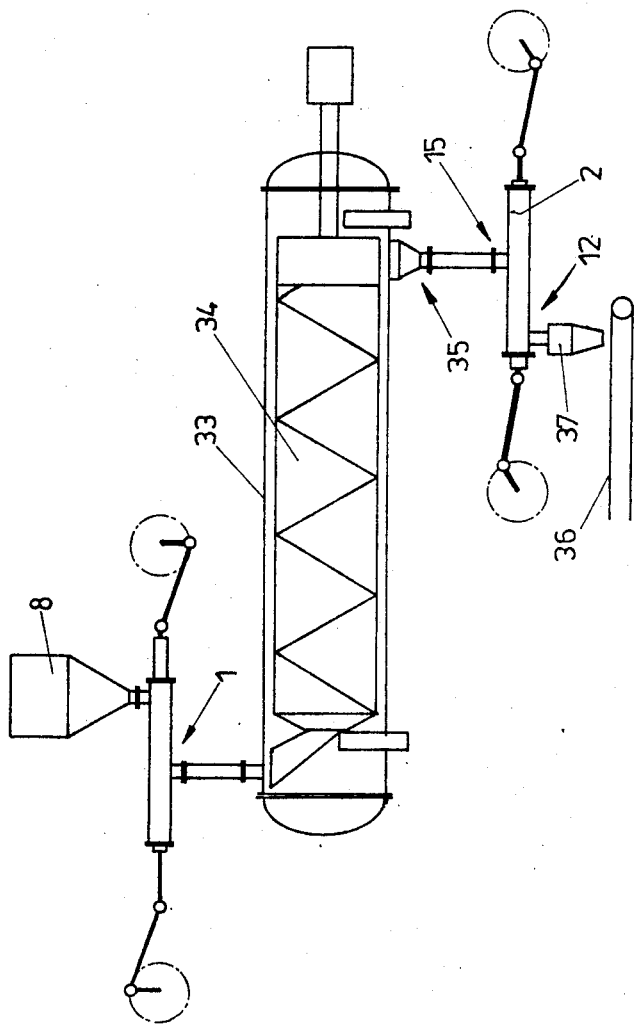

LOCK FOR THE TRANSPORT OF BULK MATERIAL

The invention relates to a lock for the transport of bulk material between chambers being under different pressure with a preferably horizontal guide tube, which comprises on different sides of its wall a first opening leading to the chamber with lower pressure and in an axial distance therefrom a second opening leading to the chamber with higher pressure, and with slides being tightly guided in the guide tube. In many areas of chemical or processing techniques processes are executed under pressures different from the ambient pressure because of thermodynamic or economic reasons. When the reactands or products of these processes are dustlike or grained solid matter there result many problems when they are put into or discharged from the areas of higher or lower pressure. On the one side the material properties (e.g. grain size, flow behaviour) should be changed as little as possible, whereas on the other side it is aimed at material transport as continous as possible between the chambers being under different pressure. Moreover the gas exchange should be kept small. With the known locks these conditions are not satisfiable or only with great difficulties. Especially the known constructions show a great wear because of the nature of the bulk material.

From JP-58-109 330 a lock has become known, wherein a horizontal guide tube comprises an opening to a chamber with lower pressure and in an axial distance an opening to a chamber with higher pressure. In the guide tube there are guided tightly two slides kept at a certain distance from one another, wherein mud is charged from the chamber with lower pressure into the gap between the slides. After displacing the slides to the opening to the chamber with higher pressure the mud is pressed into a pressurized vessel by a pressurized fluid. In this construction the constructive expenditures for the discharge of mud with the help of the pressurized fluid are disadvantageous.

The invention aims at solving the task to provide a simple and wear resisting construction of a lock for the transport of bulk material and with this to provide the possibility to reduce pressure losses to a minimum and to reduce the pressure drop in the chamber with the higher pressure level. For solving this task the invention is essentially characterized in that a lock chamber is guided tightly and driven by a reciprocal movement in the guide tube, which chamber comprises openings, which can be brought in coincidence with the first and the second opening of the guide tube at the points of reversal of the reciprocal movement, that in axial direction adjacent to the lock chamber are arranged slides being tightly guided in the guide tube, which slides slide over the openings of the guide tube, and that at the end of the guide tube being opposite of the first opening a piston is guided tightly in the guide tube and is driven to moving in opposite direction to the lock chamber. Because of the fact that the bulk material to be transported is enclosed by the lock chamber and that the lock chamber is driven by a reciprocal movement in the guide tube, the bulk material does only scarcely or not at all touch the guiding surfaces during transport and therefore wear of the guiding surfaces is avoided to a large degree. As soon as the lock chamber is displaced in axial direction the first opening of the guide tube is closed by the slide after the lock chamber had been filled, and also the second opening of the guide tube remains closed by the slide, until the corresponding opening is brought to coincidence with the second opening of the guide tube. With this a pressure drop or pressure rise is avoided in the upstream and downstream chambers during the period of the movement of the lock chamber from one end position to another. Because of the fact that at the end of the guide tube being opposite of the first opening a piston is guided tightly in the guide tube and is driven to moving in opposite direction to the lock chamber it is additionally possible to raise the pressure in the lock chamber after being charged with bulk material and to bring it to atmospheric pressure after discharge of the bulk material.

According to the invention there is preferably guided in the guide tube a lock chamber tube comprising the lock chamber, wherin the lock chamber is delimited by transverse walls and which tube forms the slides. With this the arrangement according to the invention is preferably in such a manner that the lock chamber tube being guided in the guide tube projects on both ends beyond the lock chamber with a length, which is greater than the axial center distance of the first opening to the second opening of the guide tube and the diameter of these openings. In this manner the openings of the guide tube are kept closed by the lock chamber tube and a pressure compensation between the lock chamber and the upstream and downstream chambers is only possible during the periods when the openings of the lock chamber coincide with the openings of the guide tube. A pressure drop in the chamber with higher pressure is only possible in the amount of the volume of the lock chamber being already under increased pressure because of the movement of the piston minus the volume of the bulk material being in the lock chamber. When the lock chamber is filled with bulk material a relatively small volume results therefrom which may cause a pressure drop.

According to a preferred embodiment of the invention the arrangement is thus that the transverse wall delimiting the lock chamber at the side adjacent to the piston seals the lock chamber tube in a leaky manner. Thereby a pressure drop in the lock chamber is compensated because the lock chamber is not sealed against the working chamber of the piston. With this the piston may be slideable into the guide tube close to the second opening so that the displacement effect of the piston is sufficient to raise the pressure in the lock chamber to a sufficient value. Therefore pressure losses to the extent of the volume of the lock chamber are also avoided. Preferably the piston is guided tightly in a piston guide tube, which is fixed concentrically in the guide tube by leaving open an annular gap and which is closed by the lock chamber tube, which is movable into the annular gap. Thereby it is taken into account that the lock chamber tube must slide over the second opening of the guide tube during the whole sliding movement of the lock chamber and that nevertheless the power stroke of the piston must not be restricted.

Preferably a pipe lining of a material with good wear characteristics is set in separably into the guide tube at least in the area of the first and the second opening of the guide tube, which pipe lining comprises openings coinciding with the first and the second openings of the guide tube. Because this pipe lining comprises openings coinciding with the openings of the guide tube the transport of bulk material into an out of the lock chamber is not hindered by these openings. Bulk material being in the lock chamber may be brought into contact with the guide tube during the sliding movement and may cause some wear of the guiding elements. This is taken into account by the fact that bulk material comes into contact with the pipe lining only and that this pipe lining is made of a material with good wear characteristics and is set in replacebly into the guide tube. According to the invention the guide tube and the pipe lining comprise flanges at their ends, which are bolted with one another, so that a change is possible in a siple manner.

According to another preferred embodiment of the invention the arrangement is thus that the openings of the lock chamber are axially displaced from one another, that the transverse wall delimiting the lock chamber and being arranged in the area of that opening through which the bulk material is brought into the lock chamber is arranged approximately perpendicular to the axis of the guide tube and that the transverse wall delimiting the lock chamber and being arranged in the area of that opening through which the bulk material is delivered from the lock chamber is arranged inclined to the axis of the guide tube and in the direction to this opening. Bulk material being charged into the lock chamber therefore does not fall directly onto the opening of the lock chamber being arranged at the opposite side. The wall being arranged approximately perpendicular to the axis of the guide tube has the effect that bulk material in the lock chamber is pressed against this perpendicular wall because of its inertia during the rapid reciprocal movement of the lock chamber and that the opening being arranged at the opposite side of the lock chamber is kept free to a large extent. At the reversing of the movement bulk material is pressed against the inclined wall because of its inertia and in such a manner the discharge of bulk material from the lock chamber is aided by the mass effect.

Because the reciprocal movement of the lock chamber takes place relatively rapidly the transport through the lock chamber takes place without large interruptions. According to the invention preferably several guide tubes are arranged side by side, wherein the strokes of the lock chambers are phase-shifted. With such an arrangement the transport through the lock chamber takes place continuously in practice. For instance two guide tubes are arranged side by side and the lock chambers are driven in opposite direction.

According to the invention the lock chamber tube and the piston are suitably driven by seperate crank mechanisms. These crank mechanisms are in general displaced by 180° relative to each other so that a precisely double motion of the lock chamber and the piston takes place. Besides it is also possible to arrange these two crank mechanisms in such manner that they can be phase-shifted relative to each other. When these two crank mechanisms are not displaced by 180° but by a smaller angle relative to each other, it is possible to effect a lesser pressure rise in the lock chamber by the piston, if such a lesser pressure rise is desired.

The lock according to the invention may for instance serve for the charging of bulk material from a hopper with atmospheric pressure into a chamber with higher pressure. In this case bulk material enters the lock chamber through the first opening and is discharged through the second opening of the lock chamber into the chamber with higher pressure. This lock may also be used to discharge bulk material from the chamber with higher pressure into the open air without being forced to accept a pressure drop in the chamber with higher pressure, wherein the lock is connected only in a reversed manner so that bulk material enters into the lock chamber through the second opening of the guide tube and is discharged into the open through the first opening.

The lock according to the invention can for instance advantageously be used for a thermodynamic process for drying or gasification of coal.

In the drawing the invention is described schematically with the aid of examples of embodiments.

FIGS. 1 and 2 show a lock in an axial section in different end positions,

FIGS. 3 and 4 show a lock with drive units, wherein FIG. 3 shows a side view and FIG. 4 shows a top view, FIGS. 5 and 6 show an example of an embodiment of the use of a lock in a coal drying installation, wherein FIG. 5 shows a side view, partial a sectional view, and FIG. 6 shows a frontal view.

Figure 3:
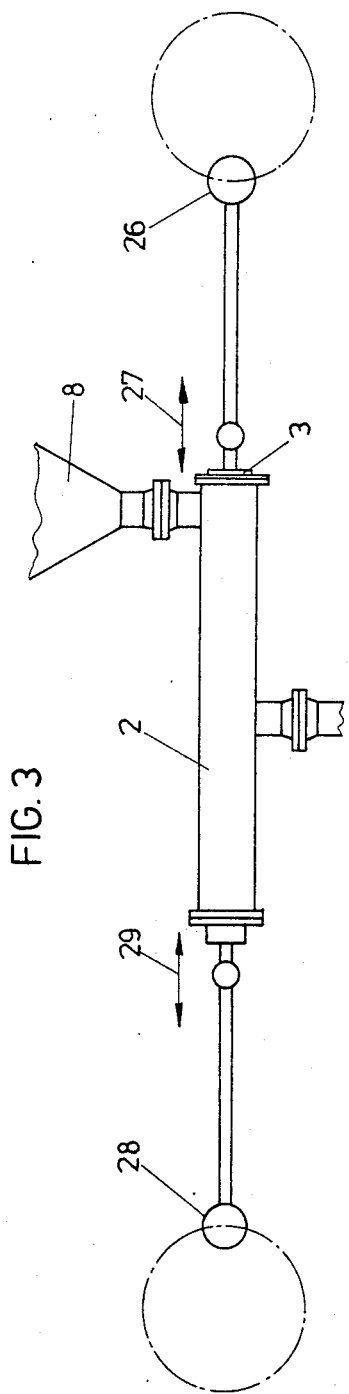

The lock 1 according to FIGS. 1 and 2 comprises a guide tube 2, in which a lock chamber tube 3 is axially displaceable and is driven by a reciprocal movement. In this lock chamber tube 3 a lock chamber is delimited by transverse walls 5 and 6. The connecting piece 7 is a connecting piece to which is attached a hopper 8 for bulk material being under atmospheric pressure. 9 is a pipe lining made from a material with a large wear-resistance, which lining is put into the guide tube 2. The guide tube and the pipe lining are formed with flanges 10, 11 which are separably bolted with one another. Through a first opening 12, which penetrates both the guide tube 2 and the pipe lining 9, bulk material enters into the lock chamber 4 via the connecting piece 7. The lock chamber 4 shows also an opening 13 which coincides with the opening 12 in the position of FIG. 1. At the opposite side the lock chamber shows an opening 14, which is, however, covered by the pipe lining 9 and the guide tube 2 in the position of FIG. 1. In an axial distance from the opening 12 the pipe lining 9 and the guide tube 2 comprise an opening 15 at the opposite side, which opening is connected with a chamber with higher pressure via a connecting piece 16. In the position shown in FIG. 1, in which the lock chamber is being filled, the opening 15 of the guide tube 2 and the pipe lining 9 is covered by a part designated 3a of the lock chamber tube 3, which part 3a serves as a slide.

Starting from the position of FIG. 1 the reciprocal movement of the lock chamber tube 3 starts in the direction of arrow 17 after charging of the lock chamber 4 and the lock chamber reaches the position 4' shown in FIG. 2. In this position the first opening 12 is closed by the lock chamber tube 3 and the opening 14 of the lock chamber coincides with the second opening 15. In this position the discharge out of the lock chamber 4 via the connecting piece 16 is effected.

The wall 5 is arranged perpendicular to the axis of the guide tube 2. By this wall 5 the movement in the direction of arrow 17 is transmitted to the bulk material being in the lock chamber 4 and by its inertia the bulk material is pressed against the wall 5 so that the opening 14 is substantially left free of the bulk material and the bulk material does not rub the pipe lining 9. At the dead centre position of the movement shown in FIG. 2 the bulk material reaches the inclined wall 6 because of its inertia and by this inclined wall discharge through the connecting piece 16 is favored.

At the other end 18 of the guide tube 2 a piston 20 is driven by a piston rod 19 to a movement in the opposite direction to the lock chamber 4 in the guide tube 2. While the lock chamber tube 3 is moved in the direction of arrow 17, the piston 20 is moved in the direction of arrow 21. The piston 20 is driven in a piston guide tube 23 being rigidly connected with the guide tube by a flange 22. Between the piston guide tube 23 and the guide tube 2 is an annular gap 24, into which the slide-like part 3a of the lock chamber tube is insertable when moving to the left side. The inclined wall 6 is arranged in a leaky manner in the piston guide tube 23 and represents only a deviation wall. The working chamber 25 of the piston 20 is therefore in connection with the lock chamber 4. When moving from the position shown in FIG. 1 to the position shown in FIG. 2 medium gets from the working area 25 of the piston 20 to the lock chamber and therein the pressure having been lowered to atmospheric level during charging of the lock chamber is raised to the pressure of the chamber with higher pressure being linked to the lock by the connecting piece 16 to compensate for pressure losses.

In the reverse case when moving the lock from the position shown in FIG. 2 to the position shown in FIG. 1 the pressure in the lock chamber 4 is lowered to atmospheric pressure by enlarging the working chamber 25 of the piston whereafter it is possible to start charging the lock chamber once more.

Figure 4:
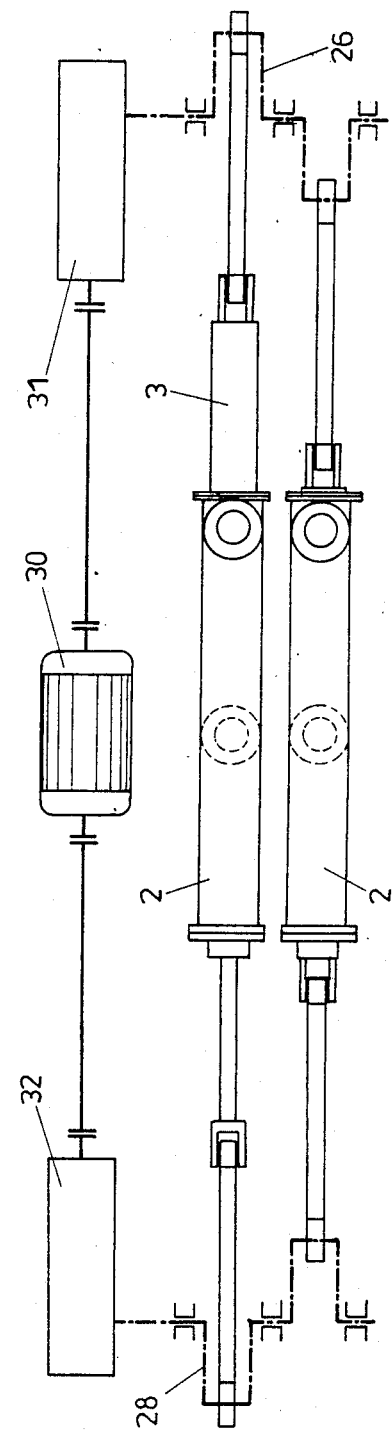

FIGS. 3 and 4 show the drive arrangement. The lock chamber tube 3 is driven by a crank mechanism 26 in the direction of double-arrow 27. The piston 20 is driven by another crank mechanism 28 in the direction of double-arrow 29 in opposite direction to the moving to the lock chamber tube 3. The driving is actuated by a common motor 30 and gears 31, 32.

As is shown in FIGS. 3 and 4 two guide tubes 2 with lock chambers 4 are arranged side by side and the crank mechanisms 26 and 28 are displaced by 180° relative to each other so that the two locks are moving in opposite direction and a continuous charging is achieved. When the crank mechanisms 26 and 28 are not displaced by 180° but by a smaller angle relative to each other the compression effect of the piston 20 can be lowered if desired.

FIGS. 5 and 6 show the use of a lock according to FIGS. 1 to 4 for a coal drying process. In a vessel 33 being under high pressure a sieve drum 34 is rotating. In the vessel 33 coal is treated under high pressure. Coal reaches into the pressure vessel 33 via the lock 1 in the manner described above. At the discharge end 35 of the vessel 33 coal is discharged via an analogous lock 1 and is thrown onto a sieve belt 36. In this embodiment the chamber with higher pressure is represented by the vessel 33. Therefore the second opening 15 of the guide tube 2 is connected with the pressure vessel 33 and the first opening 12 is connected with the feeding hopper 37. Discharging out of the pressure vessel 33 takes place in a reversed manner.

What is claimed is:

1. Lock for the transport of bulk material between chambers being under different pressure comprising a guide tube having on different sides of its wall a first opening leading to the chamber with lower pressure and in an axial distance therefrom a second opening leading to the chamber with higher pressure, a lock chamber (4) that is guided tightly and driven by a reciprocal movement in the guide tube (2), which lock chamber comprises openings (13, 14), which can be brought in coincidence with the first and the second opening (12, 15) of the guide tube at the reversal of the reciprocal movement, slide slidably arranged in the guide tube for sliding, over the openings (12-15) of the guide tube (2), and at the end of the guide tube opposite of the first opening (12) a piston (20) which is guided tightly in the guide tube (2) and which is driven to move in opposite direction to the direction the lock chamber (4) so as to selectively increase or decrease the pressure in the lock chamber.

2. Lock as claimed in claim 1, characterized in that a lock chamber tube (3) comprising the lock chamber (4) is guided in the guide tube (3) comprising the lock chamber (4) is delimited by transverse walls (5, 6) and which tube (3) forms the slides.

3. Lock as claimed in claim 2, characterized in that the lock chamber tube (3) being guided in the guide tube (2) projects on both ends beyond the lock chamber (4) with a length, which is greater than the axial center distance of the first opening (12) to the second opening (15) of the guide tube (2) and the diameter of these openings (12, 15).

4. Lock as claimed in claim 2, characterized in that the transverse wall (6) delimiting the lock chamber (4) at the side adjacent to the piston (20) seals the lock chamber tube (3) in a leaky manner.

5. Lock as claimed in one of the claim 2, characterized in that the openings (13, 14) of the lock chamber (4) are axially displaced from one another, that the transverse wall (5) delimiting the lock chamber (4) and being arranged in the area of that opening (13) through which the bulk material is brought into the lock chamber (4) is arranged approximately perpendicular to the axis of the guide tube (2) and that the transverse wall (6) delimiting the lock chamber (4) and being arranged in the area of that opening (14) through which the bulk material is delivered from the lock chamber (4) is arranged inclined to the axis of the guide tube (2) and in the direction to this opening (14).

6. Lock as claimed in one of the claim 1 characterized in that the piston (20) is slideable into the guide tube (2) close to the second opening (15).

7. Lock as claimed in one of the claim 1 characterized in that the piston (20) is guided tightly in a piston guide tube (23), which is fixed concentrically in the guide tube (2) by leaving open an annular gap (24) and which is closed by the lock chamber tube (3), which is movable into the annular gap (24).

8. Lock as claimed in one of the claim 1 characterized in that a pipe lining (9) of a material with good wear characteristics is set in separably into the guide tube (2) at least in the area of the first (12) and the second (15) opening of the guide tube, which pipe lining comprises openings coinciding with the first (12) and the second (15) openings of the guide tube (2).

9. Lock as claimed in claim 8, characterized in that the guide tube (2) and the pipe lining (9) comprise flanges (10, 11) at their ends, which are bolted with one another.

10. Lock as claimed in one of the claim 1, characterized in that the lock chamber tube (3) and the piston (20) are driven by seperate crank mechanisms (26, 28).

11. Lock as claimed in claim 10, characterized in that the two crank mechanisms are shiftable in phase relative to each other.

* * * * *